United States Patent [19]

Stine et al.

[11] 4,108,025

[45] Aug. 22, 1978

[54] AIRCRAFT HEAD-UP DISPLAY UNIT MOUNT ADJUSTMENT TOOL

[75] Inventors: Clifton E. Stine, Ridgecrest; Woodrow D. Chartier, Jr.; Mike A. Caponegro, both of China Lake, all of Calif.

[73] Assignee: The United States of America as represented by the Secretary of the Navy, Washington, D.C.

[21] Appl. No.: 801,277

[22] Filed: May 27, 1977

[51] Int. Cl.² .............................................. B25B 9/04
[52] U.S. Cl. .................................................... 81/3 R
[58] Field of Search .......................... 81/3 A; 29/271; 269/280, 321 W

[56] References Cited

U.S. PATENT DOCUMENTS

| | | | |
|---|---|---|---|
| 2,643,563 | 6/1953 | Gaudreau | 269/280 X |
| 2,806,392 | 9/1957 | Auger | 81/3 R |
| 3,015,883 | 1/1962 | Brown | 29/271 |
| 3,336,653 | 8/1967 | Symons | 29/271 |
| 3,858,463 | 1/1975 | Klavonich | 81/3 R |
| 3,903,576 | 9/1975 | Stein | 81/3 R X |

Primary Examiner—James L. Jones, Jr.
Assistant Examiner—James G. Smith
Attorney, Agent, or Firm—R. S. Sciascia; Roy Miller; Thomas W. Hennen

[57] ABSTRACT

An alignment tool for adjusting the position of a first body relative to a second body in a severely limited working space. The tool rigidly attaches to the first body and operates through a fork against a pin which is rigidly fixed to the second body. The fork is driven laterally by a lead screw which is driven by a perpendicular input shaft through a pair of 45° bevel gears. A conventional socket wrench type tool supplies input torque.

11 Claims, 4 Drawing Figures

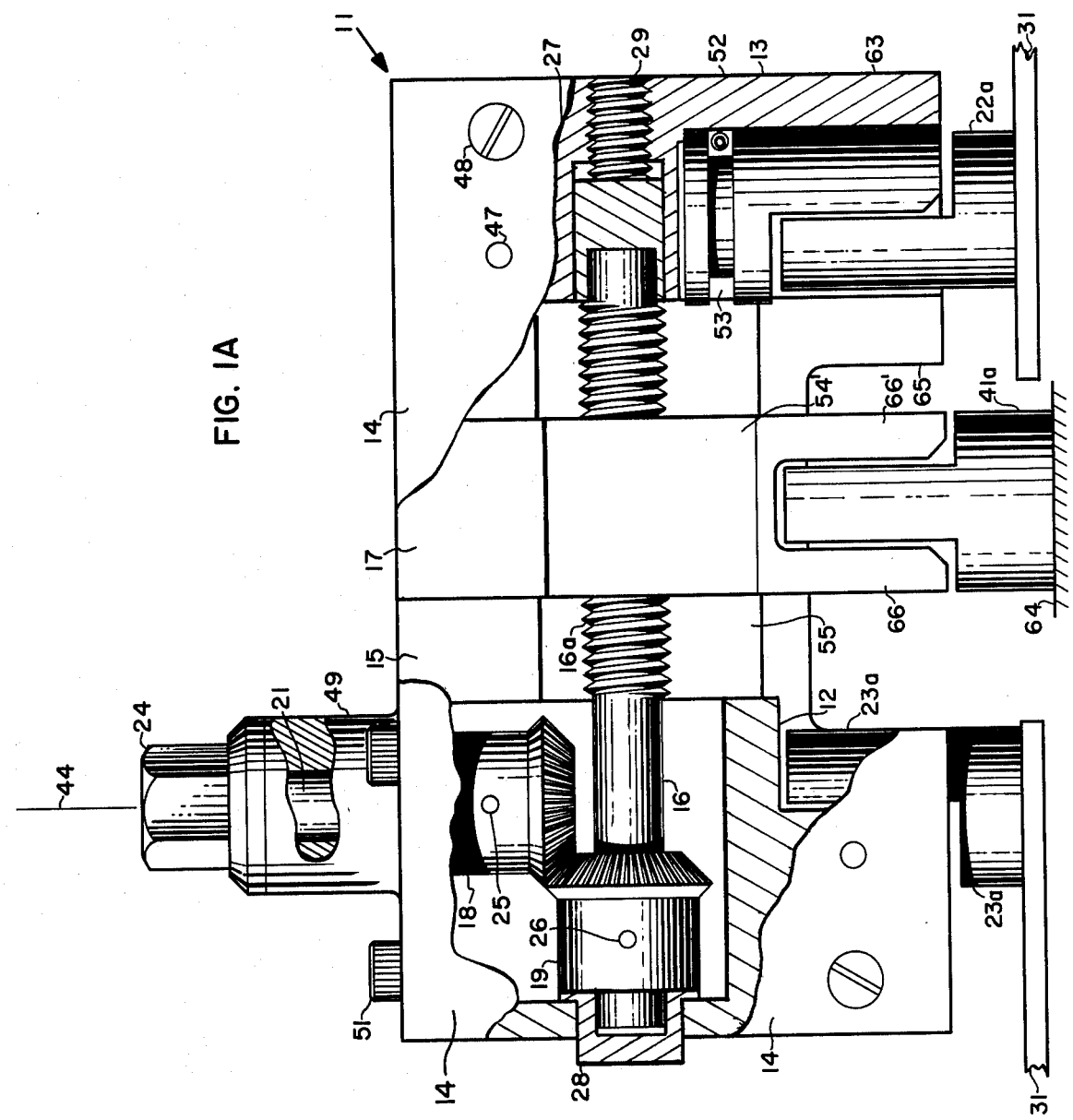
FIG. IA

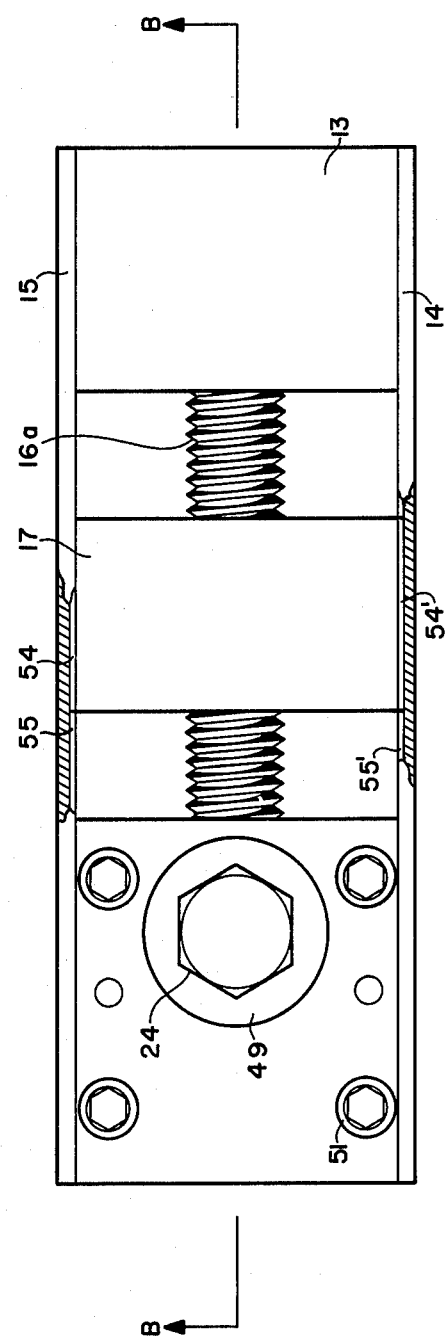
FIG. IB

AIRCRAFT HEAD-UP DISPLAY UNIT MOUNT ADJUSTMENT TOOL

BACKGROUND OF THE INVENTION

1. Field of the Invention

This invention pertains to alignment tools, and more particularly to alignment tools which use a lead screw driven by a perpendicular input shaft through 45° bevel gears to power a fork which aligns a first body relative to a second body.

2. Description of the Prior Art

Alignment tools for performing relative alignment between two bodies have included supporting structure which rigidly attaches to the first body and has opposed threaded members which are manually adjusted and which bear against the second body. Two opposed bolts, which bear against the second body and which may be manually advanced and retracted through threaded engagement with supporting structure, move the body to which the structure is attached relative to the body against which the bolt ends bear.

One use for such alignment tools is in adjusting the position of a military fighter type aircraft headup display unit mount relative to an aircraft boresight reference line. The unit mount is a frame which accurately cradles the head-up display, so that the display may be removed for maintenance and replaced without losing its precise orientation relative to an aircraft boresight reference line. The unit mount is adjustable in three axes, pitch, roll, and yaw. Commonly, pins which are rigidly attached to aircraft structure, extend through enlarged holes in the unit mount. The supporting structure and bolts attach to the mount at each enlarged hole and bear against each pin. Three or more adjusting devices may be used simultaneously to align the mount.

This method of unit mount adjustment is unsatisfactory because the mechanic must use an end wrench or similar tool to adjust each bolt, and as one bolt is advanced, the opposing bolt must be retracted, necessitating removing the wrench from one bolt head and transferring it to the other.

Also, the head-up display occupies the forward portion of the aircraft cockpit where working space is extremely limited. This means that the adjusting wrench must be swung in an arc about an axis which is approximately transverse to the aircraft longitudinal axis. The wrench can therefore only have a limited length, and may be rotated no more than 90° to 180° before it must be removed and reengaged with the next flat on the bolt head to avoid interference with cockpit structure. These limitations make the boresighting procedure of the head-up display unit mount a difficult and time consuming procedure.

SUMMARY OF THE INVENTION

The problems and difficulties inherent in the prior art have been overcome by the present invention wherein a fork driven by a lead screw bears against the aircraft alignment pin. The lead screw, which is rotatably mounted within structure which is rigidly attached to the unit mount, is driven by an input shaft aligned perpendicular to the lead screw. Bevel gears transmit torque from the input shaft to the lead screw. A conventional socket wrench type tool is used to apply torque to the input shaft by engagement with a hexagon shaped termination on the input shaft having conventional fastener dimensions. Thus, the torque application axis extends rearward into the cockpit where there is much more working space for manual manipulation of the wrench. Also, there is only one input shaft, so that once placed, the wrench remains engaged until the adjustment is complete.

BRIEF DESCRIPTION OF THE DRAWINGS

Further advantages of the present invention will emerge from a description which follows of a possible embodiment of an Aircraft Head-Up Display Unit Mount Adjustment Tool according to the invention, given with reference to the accompanying drawing figures, in which:

FIG. 1A illustrates a partially cut-away sectional side view along line B—B of an alignment tool according to the invention;

FIG. 1B illustrates a top view of an alignment tool;

DESCRIPTION OF THE PREFERRED EMBODIMENT

Figure 2:
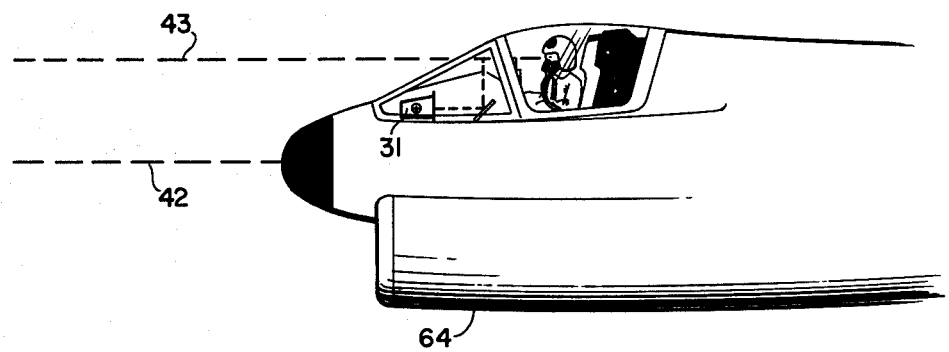
FIG. 2 illustrates the environment of a head-up display at the forward part of an aircraft cockpit.
Figure 3:
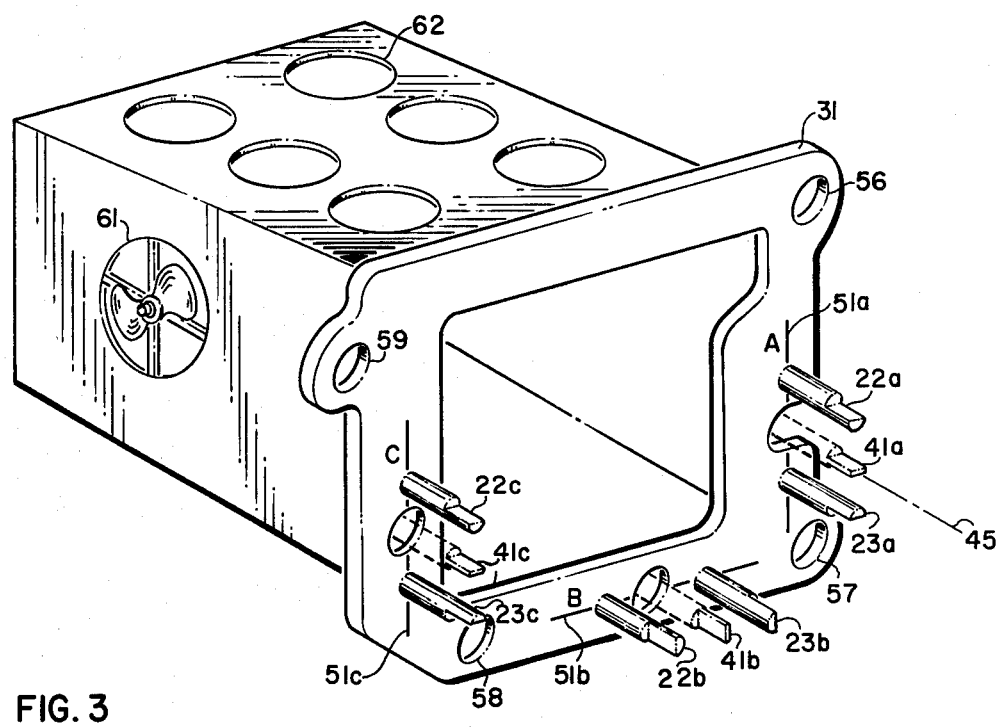
FIG. 3 illustrates a head-up display unit mount.

Referring now to the drawings, wherein like reference numerals correspond to like parts and elements throughout the several views, there is shown in FIG. 1 an alignment tool generally designated 11. Alignment tool 11 has top block 12, bottom block 13, side plates 14 and 15, lead screw 16, lead screw threads 16A, adjusting fork 17, driving bevel gear 18, driven bevel gear 19 and input shaft 21.

Tool 11 rigidly attaches to mounting pin 22A by means of insert 63 which fits within bottom block 13. Mounting pin 22A is rigidly attached to unit mount 31. Reference pin 41A is rigidly attached to aircraft structure 64 and does not move relative to aircraft bore sight reference line 42. Adjusting fork 17 straddles reference pin 41A, is held from rotation by sideplates 14 and 15, and is driven laterally by threads 16A on lead screw 16. As tine 66 or 66' on fork 17 is driven into pin 41A, the relative distance between pin 41A and pin 22A is forced to change, thereby adjusting the position of unit mount 31 relative to aircraft structure 64.

Lead screw 16 is caused to rotate by torque applied to input shaft 21 by a socket wrench type tool, not shown, which couples to hexagon termination 24 on input shaft 21 in the conventional manner. Driving bevel gear 18 is rigidly attached to input shaft 21 by means of roll pin 25, although other means of attachment such as welding or brazing, splines on gear 18 and shaft 21, or a key and slot could be used. Driving bevel gear 18 meshes with driven bevel gear 19 and causes rotation of gear 19 about an axis perpendicular to the axis of rotation of input shaft 21. Driven bevel gear 19 is rigidly attached to lead screw 16 by roll pin 26, although the alternate fastening means taught for gear 18 would work equally well for gear 19.

Insert 63 is configured to match pin 22A and provide a tight fit. End thrust of lead screw 16 is taken up by bushings 27 and 28 respectively. Axial play of lead screw 16 is removed by adjustment of set screw 29.

Because the bevel gear drive of this invention defines the input torque drive axis 44 to be approximately parallel to pin axis 45, the mechanic making the head-up unit mount adjustment may employ conventional socket wrench extensions and accessories to place the actual point of manual torque input aft from the relatively crowded head-up display space in the front portion of the cockpit, to the relatively uncrowded pilot space near the back of the cockpit. This fact in itself greatly increases the speed and convenience with which the adjustment may be made using this invention.

Three or more tools 11 may be used simultaneously, depending on the number of adjusting points provided by unit mount design. Unit mount 31 provides three adjusting points generally referred to as A, B and C. Each adjusting point has a mounting pin 22A, 22B, or 22C and a reference pin 41A, 41B or 41C, and may include a second mounting pin 23A, 23B, or 23C.

An aligning tool 11 mounted at adjusting point A shifts unit mount 31 along axis 51. It should be remembered however that axis 51 is fixed to unit mount 31 and as unit mount 31 is adjusted at points B and C, the direction of axis 51 will change slightly. It is advisable to adjust all adjusting points simultaneously because an adjustment at one point may affect the adjustment at the other points.

Insert 63 is used to grip pin 22A while second mounting pin 23A occupies space 46 between side plates 14 and 15. The tool 11 can be reversed so that insert 63 grips pin 23A while pin 22A occupies space 46, if desired. Side plates 14 and 15 maintain precision alignment of top block 12 with respect to bottom block 13 by means of dowel 47 and fastener 48 which are used at at least two places on each side plate. The position of the dowels and fasteners is not critical as long as they do not interfere with the disclosed function, and are otherwise placed in accordance with good machinist practice. Side plates 14 and 15 may be rectangular and have a rectangular or other shaped cut-out 65 for lateral clearance of pin 41A during adjustment and for exposing tines 66 of fork 17.

Shaft 21 is supported by cap 49 which is rigidly fastened to top block 12 by fasteners 51, which may be cap screws or the like. Insert 63 is specially configured to fit pin 22A, and other designs may be used to fit the tool to the unit mounts of other manufacturers. Insert 63 is retained in bottom block 13 by roll pin 52 which penetrates block 13 and intersects annular groove 53 in insert 63. This means that tool 11 is a universal adjustment tool needing only the proper insert 63 for the corresponding pin 22A.

Adjusting fork 17 has raised bearing surfaces 54 and 54'. Surfaces 54 and 54' abut side plates 14 and 15 and are guided in shallow channels 55 and 55' to prevent fork rotation and resultant binding as the lateral load on fork 17 from pin 41A increases.

In normal use, three tools 11 are used simultaneously, one at each adjusting point A, B and C. Elaborate sighting and target apparatus, not shown, provides a reference for the boresighting operation. When unit mount 31 is properly aligned relative to the pitch, roll, and yaw axes as indicated by sighting apparatus, adjustable fasteners which extend through mount holes 56, 57, 58 and 59 are tightened to lock mount 31 in position. The tools 11 are then removed. Fan 61 and holes 62 are for ventilation of instrumentation carried within unit mount 31. Other fasteners, not shown, add additional rigidity to the alignment of unit mount 31 by fastening other parts of the mount directly to aircraft structure.

When properly aligned, unit mount 31 maintains precision alignment of the head-up display which projects symbology, gunsights, and other information to a screen in front of the pilot which the pilot may rely upon when aiming the aircraft weapons.

Although the preferred embodiment has been described, it will be understood that within the purview of this invention various changes may be made in the form, details, proportion and arrangement of parts, the combination thereof and mode of operation, which generally stated results in a device capable of carrying out the features set forth, as disclosed and defined in the appended claims.

What is claimed is:

1. An alignment tool for adjusting the position of a first body relative to a second body, comprising:
   a frame having
      attachment means for fastening said frame to said first body,
      a top block,
      a bottom block,
      first and second side plates joining said top and bottom blocks,
      a driven shaft having a threaded central portion, said shaft being rotatably retained by said top and bottom blocks,
      an input shaft rotatably retained in said bottom block,
      an input gear rigidly retained to said input shaft,
      a driven gear rigidly retained to said driven shaft and maintained in driven engagement with said input gear, and
      means for applying torque to said input shaft;
   an adjusting member slidably attached to said frame and restrained to translation between first and second positions;
   means on said adjusting member cooperating with said driven shaft for causing translation of said adjusting member between said first and second positions; and
   said adjusting member having means for applying driving force against said second body.

2. An alignment tool as set forth in claim 1 wherein said adjusting member comprises a fork having a threaded bore along an axis, and parallel tines which are directed perpendicular to said axis.

3. An alignment tool as set forth in claim 1 wherein said means for applying driving force against said second body comprises:
   a plurality of parallel tines positioned to contact said second body.

4. An alignment tool as set forth in claim 1 wherein said means for applying torque to said input shaft comprises a hexagonal termination on one end of said input shaft.

5. An alignment tool as set forth in claim 1 wherein said means on said adjusting member comprises:
   said adjusting member having a threaded bore; and
   said driven shaft threaded central portion threadingly engaging said threaded bore.

6. An alignment tool for adjusting the position of a first body relative to a second body, comprising:
   a frame having attachment means for fastening said frame to said first body;
   an adjusting member slidably attached to said frame and restrained to translation between first and second positions, said adjusting member having a threaded bore;
   a driven shaft having a threaded central portion threadingly engaging said threaded bore, said driven shaft being rotatably retained in said frame;
   an input shaft rotatably retained in said frame;
   an input gear rigidly retained to said input shaft;

a driven gear rigidly retained to said driven shaft and maintained in driven engagement with said input gear; and means for applying torque to said input shaft.

7. An alignment tool as set forth in claim 6 wherein said means for applying torque to said input shaft comprises a hexagonal termination on one end of said input shaft.

8. An alignment tool for adjusting the position of a first body relative to a second body, comprising:
- a frame configured for attachment to said first body;
- a lead screw rotatably retained in said frame along a first axis, and restrained against axial motion, said lead screw having a central threaded portion;
- a driven gear rigidly attached to said lead screw;
- an input shaft rotatably retained in said frame along a second axis;
- a drive gear rigidly attached to said input shaft and maintained in driving engagement with said driven gear;
- an adjusting member positioned for translation along said frame between first and second positions, said adjusting member having a threaded bore, said lead screw central threaded portion threadingly engaging said threaded bore, said adjusting member having at least one bearing surface for contacting said second body; and
- means for applying torque to said input shaft.

9. An alignment tool for adjusting the position of a first body relative to a second body, comprising;
- a first shaft having a threaded central portion and first and second ends;
- a bottom block having a first bore for rotatably retaining said first end of said first shaft;
- a top block having a second bore for rotatably retaining said second end of said first shaft, and said top block having means for attachment to said first body;
- first and second side plates;
- said side plates each being rigidly attached to said bottom and top blocks, said first and second bores being aligned along a common axis, said first end of said first shaft being rotatably retained in said first bore, and said second end of said first shaft being rotatably retained in said second bore;
- an adjusting fork having a third bore directed along an axis, said third bore having threads which are compatible with said threaded central portion of said first shaft, and said adjusting fork having parallel tines positioned perpendicular to said third bore axis for applying driving force against said second body;
- said third bore being aligned coaxially with said first and second bores, and said adjusting fork threadingly engaging said threaded central portion of said first shaft;
- said adjusting fork being restrained by said first and second side plates to thread driven translation along said first shaft; and
- means for transmitting torque to said first shaft.

10. An alignment tool as set forth in claim 9 wherein said means for transmitting torque to said first shaft comprises:
- a second shaft rotatably retained to said bottom block and directed along an axis which is perpendicular to said first bore axis;
- means for applying torque to said second shaft;
- a first bevel gear rigidly secured to said first shaft; and
- a second bevel gear rigidly secured to said second shaft;
- said second bevel gear being positioned in driving engagement with said first bevel gear.

11. An alignment tool as set forth in claim 9 wherein said side plates are rectangular and have corresponding cut away portions for exposing said adjusting fork tines.

* * * * *